(12) United States Patent
Connors

(10) Patent No.: US 10,697,220 B2
(45) Date of Patent: Jun. 30, 2020

(54) COUNTERBALANCE DOOR DAMPENER SYSTEM AND METHOD FOR AUTOMATIC DUPLEXING UNITS

(71) Applicant: Toshiba TEC Kabushiki Kaisha, Shinagawa-ku (JP)

(72) Inventor: William M. Connors, Lexington, KY (US)

(73) Assignee: Toshiba TEC Kabushiki Kaisha, Shinagawa-ku (JP)

(*) Notice: Subject to any disclaimer, the term of this patent is extended or adjusted under 35 U.S.C. 154(b) by 0 days.

(21) Appl. No.: 16/173,284

(22) Filed: Oct. 29, 2018

(65) Prior Publication Data

US 2020/0131826 A1 Apr. 30, 2020

(51) Int. Cl.
*E05F 1/10* (2006.01)
*E05F 5/08* (2006.01)
*F16H 19/04* (2006.01)
*G03G 21/16* (2006.01)
*A47B 43/00* (2006.01)

(52) U.S. Cl.
CPC ............ *E05F 1/1083* (2013.01); *A47B 43/00* (2013.01); *E05F 1/1058* (2013.01); *E05F 5/08* (2013.01); *F16H 19/04* (2013.01); *G03G 21/1633* (2013.01); *E05Y 2900/132* (2013.01); *F16F 2230/007* (2013.01); *F16F 2230/0011* (2013.01); *F16F 2232/06* (2013.01); *G03G 2221/169* (2013.01)

(58) Field of Classification Search
CPC .............. A47B 43/00; G03G 21/1633; G03G 2221/169; E05F 1/1058; E05F 1/1083; E05F 5/08; F16H 19/04; E05Y 2900/132; F16F 2230/0011; F16F 2230/007; F16F 2232/06

See application file for complete search history.

(56) References Cited

U.S. PATENT DOCUMENTS

| | | | | |
|---|---|---|---|---|
| 5,291,634 A * | 3/1994 | Zanetti | ............... | E05D 11/1064 16/333 |
| 5,615,522 A * | 4/1997 | Tomanek | ............ | E04D 13/0357 292/338 |
| 5,904,411 A * | 5/1999 | Hayakawa | ............ | E05D 15/582 16/289 |
| 8,966,712 B1 * | 3/2015 | Yu | .............. | E05F 3/02 16/66 |
| 10,253,539 B2 * | 4/2019 | Kaiser | ................... | E05F 1/1075 |
| 2007/0127947 A1 * | 6/2007 | Kuma | ............... | G03G 15/1685 399/121 |
| 2011/0193458 A1 * | 8/2011 | Omann | ................ | E05D 15/401 312/319.2 |

(Continued)

*Primary Examiner* — Ryan D Walsh
(74) *Attorney, Agent, or Firm* — Ulmer & Berne LLP

(57) ABSTRACT

A counterbalance dampener disposed between a printer chassis and the automatic duplexer unit includes a pair of support links pivotably connected at distal ends to the chassis and the automatic duplexer unit. A pinion disposed at the distal end of the support link connected to the automatic duplexer unit rotates when the automatic duplexer unit descends into an open configuration. The pinion is in communication with a rack that translates linearly to compress a spring which provides a countering force to slow the descent of the automatic duplexer unit.

14 Claims, 5 Drawing Sheets

(56) References Cited

U.S. PATENT DOCUMENTS

| | | | |
|---|---|---|---|
| 2012/0000130 A1* | 1/2012 | Kashiwaguma | E05F 1/1058 49/348 |
| 2015/0315833 A1* | 11/2015 | Lee | E05F 3/102 16/52 |
| 2016/0168896 A1* | 6/2016 | Holzapfel | E05D 15/401 16/287 |
| 2017/0081892 A1* | 3/2017 | Fan | E05F 3/10 |
| 2017/0293253 A1* | 10/2017 | Iwase | G03G 21/1633 |
| 2018/0252015 A1* | 9/2018 | Quinn | E05F 3/102 |

* cited by examiner

COUNTERBALANCE DOOR DAMPENER SYSTEM AND METHOD FOR AUTOMATIC DUPLEXING UNITS

TECHNICAL FIELD

The subject application generally relates to a counterbalance door dampener for automatic duplexing units, and more specifically to a door dampener that counterbalances gravitational forces on an automatic duplexing unit when it is opened.

BACKGROUND

Document processing devices include printers, copiers, scanners and e-mail gateways. More recently, devices employing two or more of these functions are found in office environments. These devices are referred to as multifunction peripherals (MFPs) or multifunction devices (MFDs). As used herein, MFP means any of the forgoing.

Users may be prompted to open the automatic duplexer unit, or ADU, of an MFP to clear jammed papers. ADUs are often equipped with systems to slow the descent of an ADU when it is opened. However, if the ADU is not properly supported during opening, it is possible for the ADU to open too quickly and bounce, twist, or even over-rotate at the hinge joint. In these instances, forces associated with an ADU that is allowed to fall open can put significant stress on the ADU or even damage the ADU or printer chassis. Damaged ADUs may require a service call from a technician to repair or replace a damaged ADU. During service calls, technicians also may be required to open the ADU and can similarly damage the ADU if the ADU is allowed to open too quickly.

In addition to the cost of repairing or replacing a damaged ADU, significant human resource costs are associated with receiving a service call, logging a call, scheduling a service time, dispatching a service technician, and diagnosing and repairing a device. Such service costs can lower the distributor's profitability, increase the end user's cost per page, or both. As with any mechanical device, MFPs are subject to wear and tear and may require periodic maintenance. Reducing stress on parts such as the ADU can also help to reduce the amount of periodic maintenance required to maintain MFPs in working order.

BRIEF DESCRIPTION OF THE DRAWINGS

Various embodiments will become better understood with regard to the following description, appended claims and accompanying drawings wherein:

DETAILED DESCRIPTION

The systems and methods disclosed herein are described in detail by way of examples and with reference to the figures. It will be appreciated that modifications to disclosed and described examples, arrangements, configurations, components, elements, apparatuses, devices methods, systems, etc. can suitably be made and may be desired for a specific application. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such.

In an example embodiment, a counterbalance dampener for an automatic duplexer unit of a printer includes a first support link pivotably connected to the printer chassis at one end and a second support link at the other end. The second support link is pivotably connected to the automatic duplexer unit and includes a pinion configured to engage with a rack. When the pinion rotates, the rack is translated laterally against a spring which impinges a force against the rack.

Embodiments herein provide for a counterbalance door dampener for supporting an automatic duplexer unit (ADU) as the ADU descends after it is opened for service, maintenance, or clearing paper jams.

Figure 1:
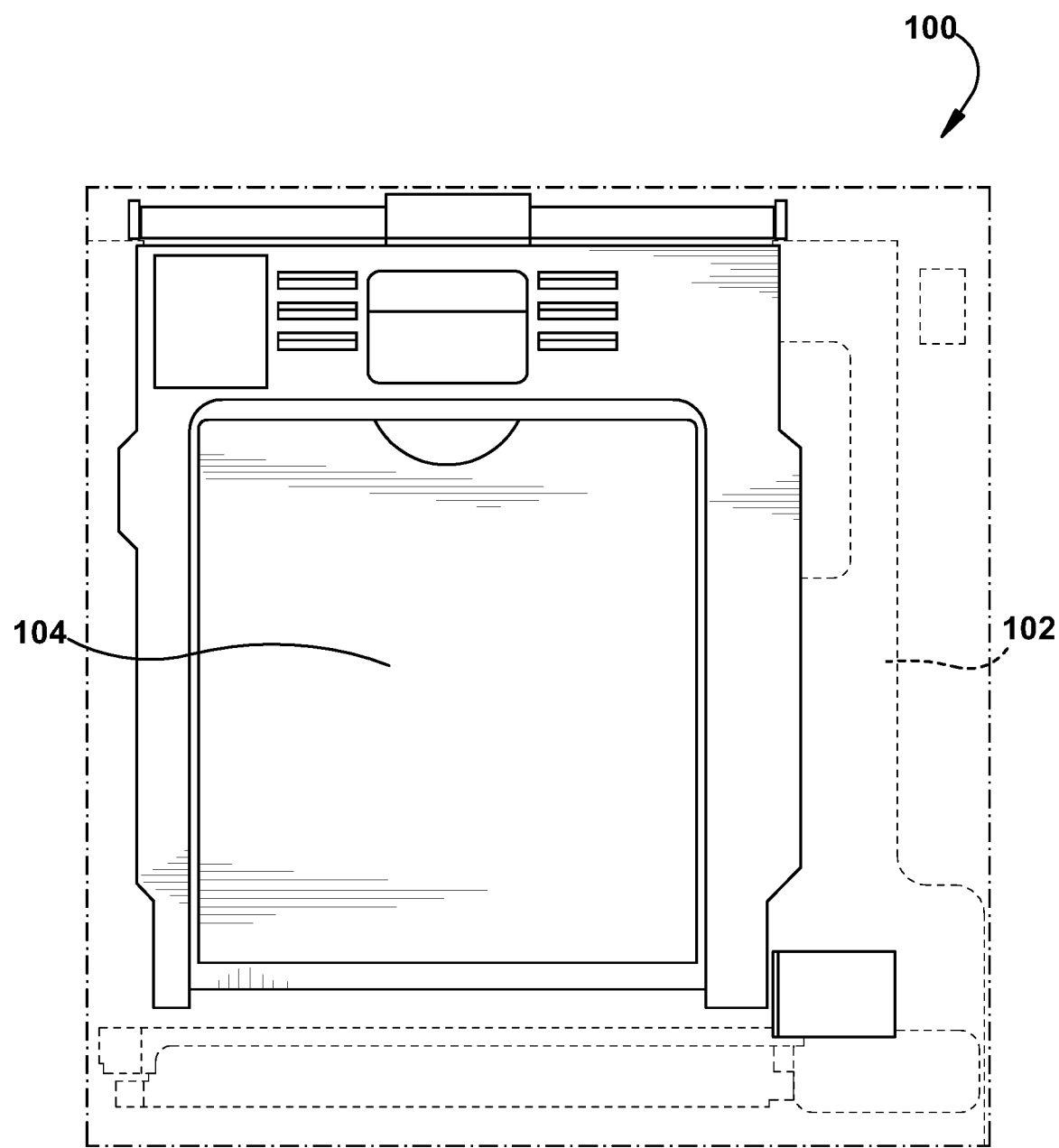
FIG. 1 is a side view of an automatic duplexer unit of a multifunction peripheral in the closed configuration.

With reference to FIG. 1, an example multifunction peripheral or MFP 100, is presented. The MFP 100 includes a chassis 102 to which an automatic duplexer unit or ADU 104 is attached. The ADU 102 is illustrated in the normal, closed condition. The ADU 102 can be opened, as illustrated below in FIGS. 3A-3C for servicing or clearing paper jams.

Figure 2:
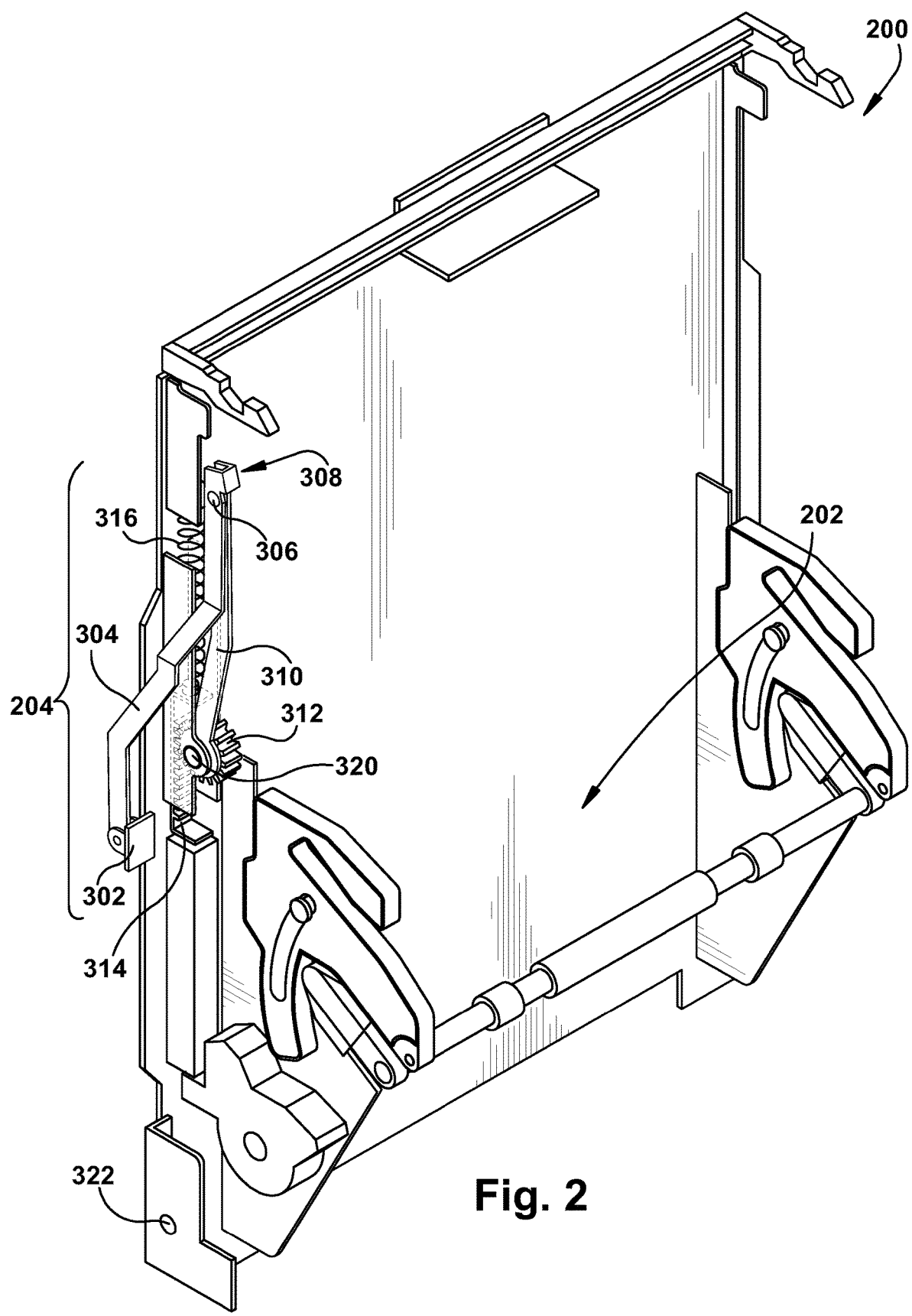
FIG. 2 is a perspective view of automatic duplexer unit of a multifunction peripheral.

With reference to FIG. 2, a perspective view of an embodiment of an ADU door dampening system 200 is illustrated. The system includes the ADU 202 (with duplexing components partially illustrated for simplicity) and a counterbalance door dampener 204. Reference numbers for certain counterbalance dampener components 302, 304, 306, 308, 310, 312, 316 are included for completeness and are explained below in more detail with reference to FIGS. 3A-3C.

Figure 3A:
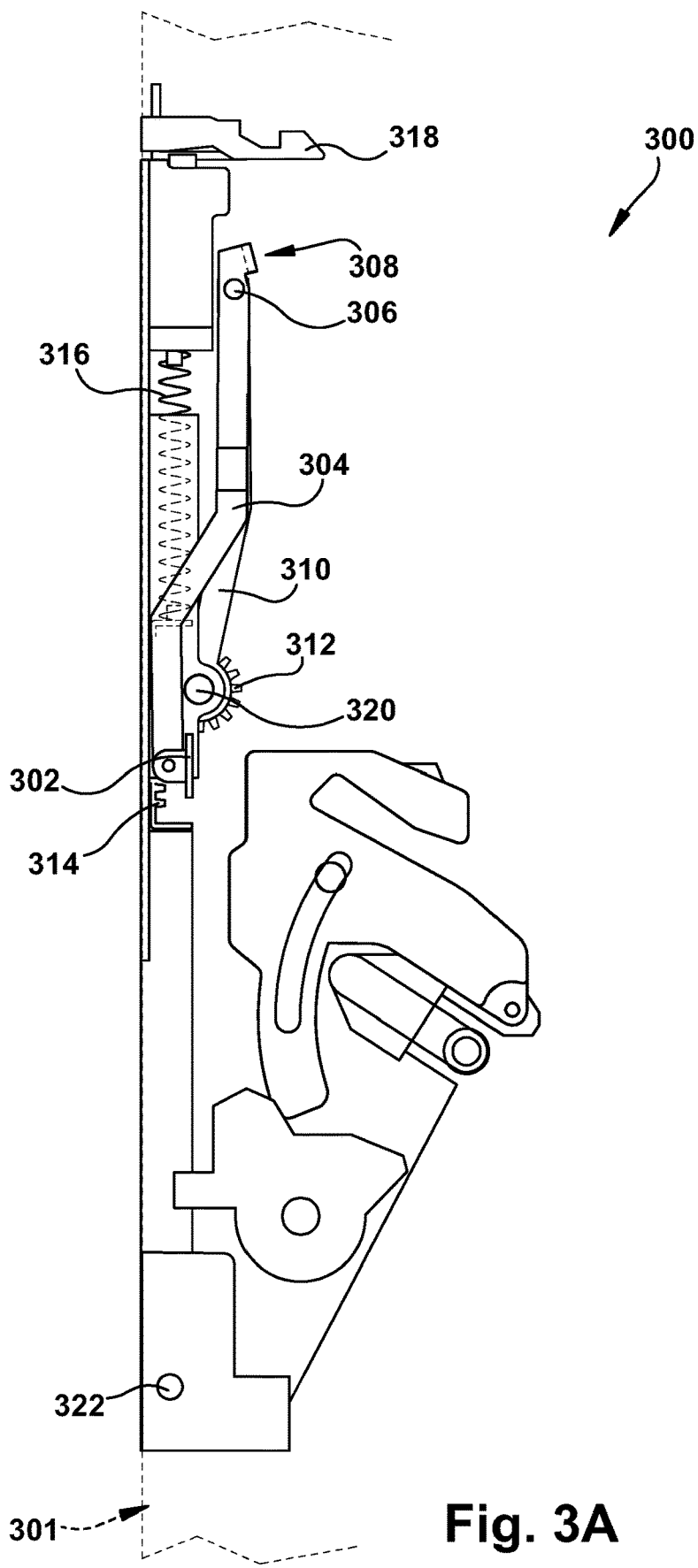
FIG. 3A is a side view of automatic duplexer unit of a multifunction peripheral in the closed configuration.

With reference to FIG. 3A, a side view of an ADU 300 is illustrated in the closed configuration. In the closed configuration, the first support link 304 and second support link 306 are folded in a space saving arrangement. At one end, the support links 304, 306 are joined by at a link pivot 306 that allows the support links 304, 306 to rotate relative to one another. A stop 308 on the first support link 304 near the link pivot 306 is explained below with regard to FIG. 3C. A first pivot anchor 302 secures the distal end of the first support link 304 to the chassis 301. The first pivot anchor 302 allows the first support link 304 to rotate relative to the chassis 301. The distal end of the second support link 306 includes a gear, or pinion 312. A second pivot anchor 320 secures the pinion 312 of the second support link 306 to the ADU 300. The second pivot anchor 320 allows the pinion 312 to rotate, the action of which will be described in more detail with regard to FIGS. 3B and 3C. The pinion 312 engages with linear gear teeth of a slideable rack 314. A compressible spring 316 is biased against the slideable rack 314. When the ADU is in the closed configuration, the compressible spring 316 may assert no force or a small biasing force onto the rack 314. A latch 318 secures the ADU 300 to the chassis 301 and prevents the ADU 300 from opening and pivoting at the hinge 322 until desired by a user or technician.

Figure 3B:
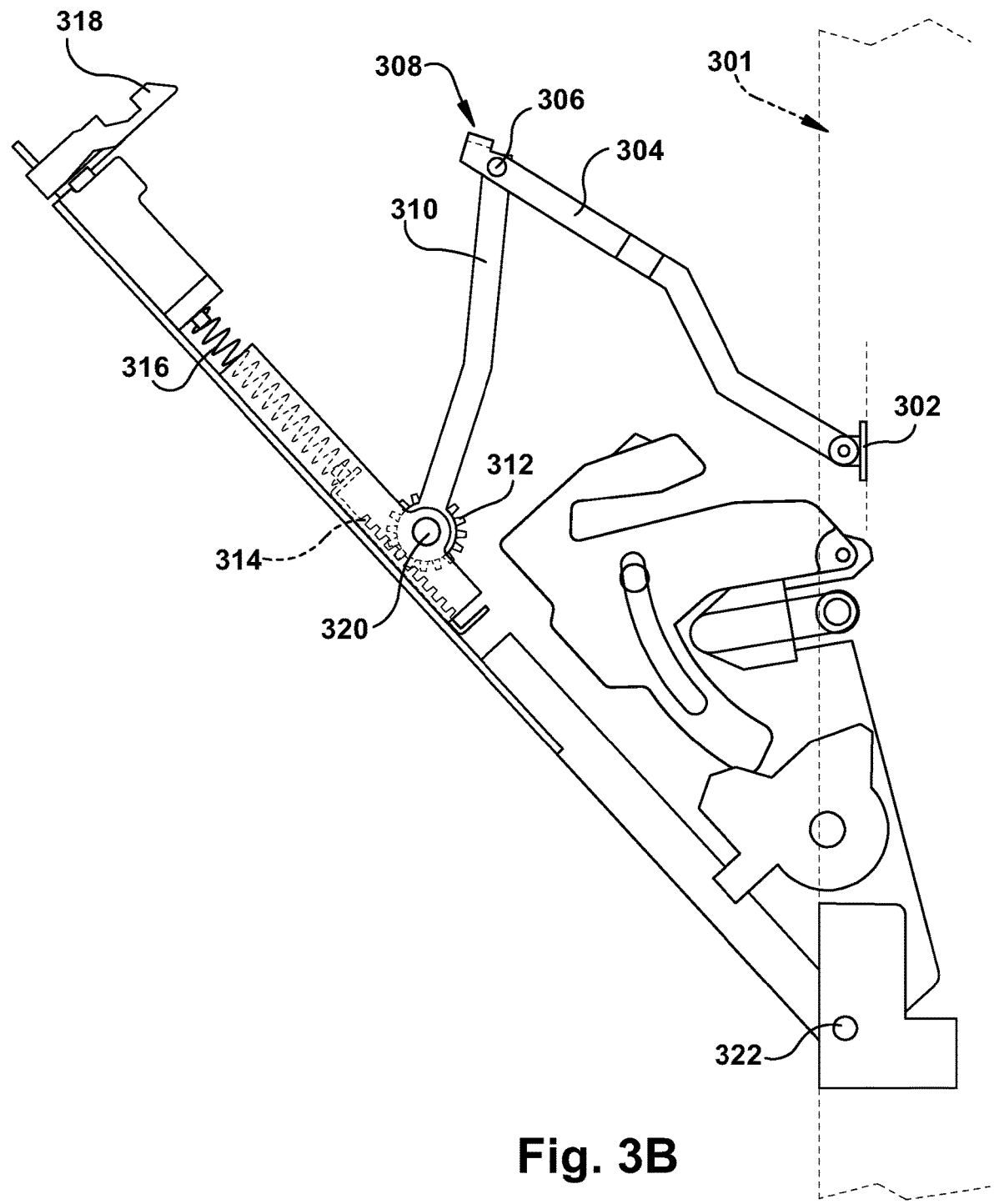
FIG. 3B is a side view of automatic duplexer unit of a multifunction peripheral during opening.

Referring also to FIG. 3B, once the latch 318 is opened by a user or technician, the ADU 300 rotates at the hinge 322 and begins to descend. The first pivot anchor 302 maintains the distal end of the first support link 304 in proximity to the chassis 302, which the second pivot anchor 320 pulls the distal end of the second support link 310 with the ADU 300. This action causes the support links 304, 306 to begin to open and rotate about the link pivot 306. As the second support link 310 rotates, the pinion 312 also rotates clockwise. As the pinion 312 rotates clockwise, the teeth of the pinion 312 engage with the teeth of the rack 314 causing the rack 314 to translate laterally against the spring 316 and compress the spring 316. The compressed spring 316 impinges a force against the rack 314. As the compression force of the spring 316 impinges against the rack 314, this creates a moment in the pinion 312 that resists rotation. This moment is carried through to the support links 304, 306, which are prevented from opening too quickly, thus dampening the opening descent of the ADU 300. The rack 314, pinion 312, and spring 316 can be configured to substantially counterbalance the gravitational force on the ADU 300 and prevent the ADU 300 from opening too quickly. Advantageously, the force exerted on the rack 314 by the spring 316 increases as the ADU 300 opens which helps to counterbalance the increasing torque from the ADU 300 as its center of gravity shifts outward. In an embodiment, the spring 316 can be configured to work via tension instead of compression, for example by disposing the spring 316 on the other side of the rack 314 as would be understood in the art.

Figure 3C:
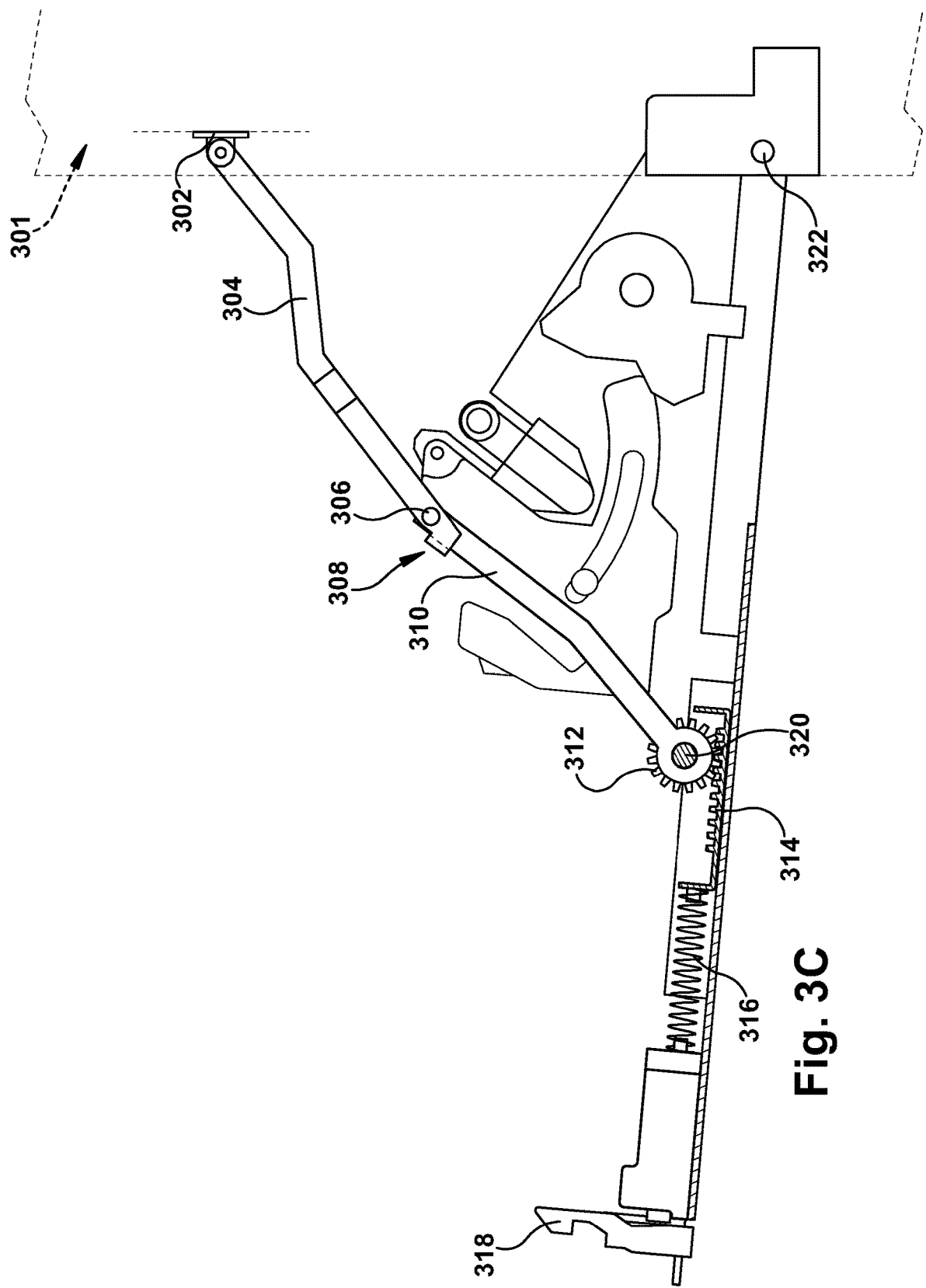
FIG. 3C is a side view of automatic duplexer unit of a multifunction peripheral in the opened configuration.

Referring now also to FIG. 3C, the ADU 300 is illustrated after reaching the fully opened configuration. In this illustration, the slideable rack 314 has been illustrated in a partially cutaway view. In the open configuration, the rack 314 is fully extended against the spring 316 and the spring 314 is compressed with the maximum desired force. In an example configuration approximately 77% of the weight of the ADU 300 can be counterbalanced by the compressed spring 316 when the ADU 300 is fully opened. The weight of the ADU 300 is also carried as tension through the support links 304, 306. By counterbalancing the forces of the ADU 300, the ADU 300 will behave as a dampened system when opening, thereby slowing the opening speed of the ADU 300 and reducing forces required to stop the ADU 300 once it has reached the fully opened configuration.

As the ADU 300 fully opens, the stop 308 that is attached to the first support link 304 rotates against the second support link 310. The stop 308 prevents the support links 304, 306 from rotating further once the ADU 300 is fully opened. The stop 308 prevents the hinge 322 at the bottom of the ADU from being over-rotated and damaging the hinge 322, the chassis 301, or the case of the printer. For example, the stop 308 can prevent the ADU 300 from being rotated past approximately 85 degrees. Advantageously, the stop 308 can be configured such that the support links 304, 306 are always less than 180 degrees relative to one another, even when fully opened. For example, the starting angle can be approximately 160-170 degrees. Maintaining a slight initial starting angle between the support links 304, 306 prevents the support links 304, 306 from locking up when the user or technician begins to close the ADU 300.

In light of the foregoing, it should be appreciated that the present disclosure significantly advances the art of controlling the descent of an ADU upon opening. While example embodiments of the disclosure have been disclosed in detail herein, it should be appreciated that the disclosure is not limited thereto or thereby inasmuch as variations on the disclosure herein will be readily appreciated by those of ordinary skill in the art. The scope of the application shall be appreciated from the claims that follow.

What is claimed is:

1. A counterbalance dampener for an automatic duplexer unit of a printer, comprising:
   a first support link pivotably connected at a first end to a chassis of the printer;
   a second support link pivotably connected at a first end to a second end of the first support link, the second support link pivotably connected at a second end to the automatic duplexer unit;
   a pinion disposed on the second end of the second support link and configured to rotate with the second end of the second support link;
   a rack configured to engage with the pinion and translate laterally when the pinion rotates;
   a spring configured to impinge a force against the rack when the rack translates laterally; and
   a stop disposed on the second end of the first support link configured to stop rotation of the first support link relative to the second support link when the automatic duplexer unit is fully opened.

2. The counterbalance of claim 1, wherein the spring is configured to compress as the automatic duplexer unit descends into an open configuration.

3. The counterbalance of claim 2, wherein when the automatic duplexer unit is opening, the pinion on the second end of the second support link is rotated and the rack is translated laterally to compress the spring.

4. The counterbalance of claim 2, wherein as the automatic duplexer unit descends into an open configuration, compression of the spring is configured to increase force applied through the rack and pinion to dampen a descent of the automatic duplexer unit.

5. The counterbalance of claim 1, wherein the stop is configured to stop rotation of the first support link relative to the second support link when an initial starting angle of less than 180 degrees exists between the first support link and the second support link.

6. The counterbalance of claim 5, wherein the initial starting angle is between approximately 160 degrees to approximately 170 degrees.

7. A counterbalance dampener for an automatic duplexer unit of a printer, comprising:
   a first support link pivotably connected at a first end to a chassis of the printer;
   a second support link pivotably connected at a first end to a second end of the first support link, the second support link pivotably connected at a second end to the automatic duplexer unit;
   a pinion disposed on the second end of the second support link and configured to rotate with the second end of the second support link;
   a rack configured to engage with the pinion and translate laterally when the pinion rotates; and
   a spring configured to impinge a force against the rack when the rack translates laterally;
   wherein when the automatic duplexer unit is fully open the spring is configured to counterbalance substantially more than half of the weight of the automatic duplexer unit.

8. The counterbalance of claim 7, wherein when the automatic duplexer unit is fully open the spring is configured to counterbalance more than 75% of the weight of the automatic duplexer unit.

9. A multifunction printer, comprising:
   a chassis;
   an automatic duplexer unit; and
   a counterbalance dampener disposed between the chassis and the automatic duplexer unit that includes
      a pair of support links pivotably connected at distal ends to the chassis and the automatic duplexer unit, a pinion disposed on the distal end of the support link that is pivotably connected to the automatic duplexer unit, and a linearly slideable rack in communication with the pinion and configured to compress a spring to provide a counterbalance force when the pinion is rotated;

wherein when the automatic duplexer unit is opening, the pair of support links are configured to rotate about a common pivot until a stop on one of the support links prevents further rotation.

10. The multifunction printer of claim 9, wherein the stop is configured to prevent further rotation when the pair of support links reach an initial starting angle, wherein the initial starting angle prevents the pair of support links from locking when a user subsequently attempts to close the automatic duplexer unit.

11. The multifunction printer of claim 10, wherein the initial starting angle is between approximately 160 degrees to approximately 170 degrees.

12. The multifunction printer of claim 9, wherein when the automatic duplexer unit is fully open the spring is configured to counterbalance substantially more than half of the weight of the automatic duplexer unit.

13. The multifunction printer of claim 12, wherein when the automatic duplexer unit is fully open the spring is configured to counterbalance more than 75% of the weight of the automatic duplexer unit.

14. The multifunction printer of claim 9, wherein as the automatic duplexer unit descends into an open configuration, compression of the spring is configured to increase force applied through the rack and pinion to dampen a descent of the automatic duplexer unit.

* * * * *